US010511425B2

(12) United States Patent
Sun et al.

(10) Patent No.: US 10,511,425 B2
(45) Date of Patent: Dec. 17, 2019

(54) CHANNEL-STATE INFORMATION PROCESS PROCESSING METHOD, NETWORK DEVICE, AND USER EQUIPMENT

(71) Applicant: Huawei Technologies Co., Ltd., Shenzhen (CN)

(72) Inventors: Jingyuan Sun, Shenzhen (CN); David Jean-Marie Mazzarese, Beijing (CN); Yongxing Zhou, Beijing (CN); Liang Xia, Shenzhen (CN); Xiaotao Ren, Shenzhen (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/201,672

(22) Filed: Nov. 27, 2018

(65) Prior Publication Data

US 2019/0140797 A1 May 9, 2019

Related U.S. Application Data

(63) Continuation of application No. 15/803,671, filed on Nov. 3, 2017, now Pat. No. 10,164,749, which is a (Continued)

(51) Int. Cl.
*H04L 12/801* (2013.01)
*H04L 5/14* (2006.01)
(Continued)

(52) U.S. Cl.
CPC .......... *H04L 5/0048* (2013.01); *H04B 7/024* (2013.01); *H04B 7/0626* (2013.01); *H04L 1/0026* (2013.01); *H04L 1/0027* (2013.01)

(58) Field of Classification Search
CPC ..... H04L 5/0048; H04L 1/0027; H04B 7/024; H04B 7/0626
See application file for complete search history.

(56) References Cited

U.S. PATENT DOCUMENTS 9,838,177 B2 12/2017 Sun et al.
2007/0217383 A1 9/2007 Mitani
(Continued)

FOREIGN PATENT DOCUMENTS

CN 102315871 A 1/2012
CN 102696183 A 9/2012
(Continued)

OTHER PUBLICATIONS

Ericsson et al.,"On aperiodic reporting of CSI Processes", 3GPP TSG-RAN WG1 #70, R1-123832, Qingdao, China, 3rd Generation Partnership Project, Valbonne, France (Aug. 13-17, 2012), total 2 pages.
(Continued)

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

Embodiments of the present invention provide a channel-state information process processing method, a network device, and a user equipment, where the channel-state information process processing method includes: after receiving a first channel-state information CSI request sent by a first network device, if CSI corresponding to multiple aperiodic CSI processes has not been reported by a user equipment, dropping CSI corresponding to a part of aperiodic CSI processes among the multiple aperiodic CSI processes, where each CSI process is associated with a channel measurement resource and an interference measurement
(Continued)

resource. A problem existing after a CoMP technology is introduced can be solved that the UE cannot implement processing of multiple CSI processes.

20 Claims, 4 Drawing Sheets

Related U.S. Application Data continuation of application No. 14/671,926, filed on Mar. 27, 2015, now Pat. No. 9,838,177, which is a continuation of application No. PCT/CN2012/082384, filed on Sep. 28, 2012.

(51) Int. Cl.
*H04L 12/751* (2013.01)
*H04L 12/28* (2006.01)
*H04L 5/00* (2006.01)
*H04B 7/06* (2006.01)
*H04B 7/024* (2017.01)
*H04L 1/00* (2006.01)

(56) References Cited

U.S. PATENT DOCUMENTS

| | | | |
|---|---|---|---|
| 2008/0008212 A1* | 1/2008 | Wang | H04B 7/2637 370/503 |
| 2008/0144493 A1 | 6/2008 | Yeh | |
| 2008/0214198 A1 | 9/2008 | Chen et al. | |
| 2011/0149769 A1 | 6/2011 | Nagaraja | |
| 2012/0034926 A1 | 2/2012 | Damnjanovic et al. | |
| 2012/0287815 A1 | 11/2012 | Attar | |
| 2012/0287875 A1 | 11/2012 | Kim et al. | |
| 2013/0040558 A1 | 2/2013 | Kazmi | |
| 2013/0070720 A1* | 3/2013 | Pan | H04B 7/0626 370/329 |
| 2013/0114554 A1 | 5/2013 | Yang et al. | |
| 2013/0121312 A1* | 5/2013 | Roman | H04B 7/0486 370/335 |
| 2013/0301422 A1 | 11/2013 | Caretti et al. | |
| 2013/0301432 A1* | 11/2013 | Hammarwall | H04W 24/02 370/252 |
| 2013/0322361 A1 | 12/2013 | Ko et al. | |
| 2014/0024388 A1 | 1/2014 | Earnshaw et al. | |
| 2014/0219095 A1* | 8/2014 | Lim | H04W 72/085 370/235 |
| 2014/0226582 A1* | 8/2014 | Zeng | H04B 7/0626 370/329 |
| 2014/0329553 A1* | 11/2014 | Nakashima | H04W 52/365 455/522 |
| 2015/0208265 A1* | 7/2015 | Dalsgaard | H04B 17/382 370/252 |

FOREIGN PATENT DOCUMENTS

| | | |
|---|---|---|
| RU | 2009133782 A | 3/2011 |
| WO | 2012008815 A2 | 1/2012 |
| WO | 2013148347 A1 | 10/2013 |

OTHER PUBLICATIONS

Ericsson et al., "Configuration of CSI Processes for Periodic and Aperiodic Reporting", 3GPP TSG-RANWG1 #70, R1-123830, Qingdao, China, 3rd Generation Partnership Project, Valbonne, France (Aug. 13-17, 2012), total 4 pages.
3GPP TS 36.213 V11.0.0 (Sep. 2012) 3rd Generation Partnership Project; Technical Specification Group Radio Access Network; Evolved Universal Terrestrial Radio Access (E-UTRA); Physical layer procedures (Release 11), 3rd Generation Partnership Project, Valbonne, France (Sep. 18, 2012), total 143 pages.
ETSI TS 136 213 V11.0.0 (2012-10), "LTE; Evolved Universal Terrestrial Radio Access (E-UTRA); Physical layer procedures (3GPP TS 36.213 version 11.0.0 Release 11)", ETSI, total 145 pages.

* cited by examiner

CHANNEL-STATE INFORMATION PROCESS PROCESSING METHOD, NETWORK DEVICE, AND USER EQUIPMENT

CROSS-REFERENCE TO RELATED APPLICATIONS

This application is a continuation of U.S. patent application Ser. No. 15/803,671, filed on Nov. 3, 2017, which is a continuation of U.S. patent application Ser. No. 14/671,926, filed on Mar. 27, 2015, now U.S. Pat. No. 9,838,177. The U.S. patent application Ser. No. 14/671,926 is a continuation of International Patent Application No. PCT/CN2012/082384, filed on Sep. 28, 2012. All of the afore-mentioned patent applications are hereby incorporated by reference in their entireties.

TECHNICAL FIELD

Embodiments of the present invention relate to the field of communications technologies, and in particular, to a channel-state information process processing method, a network device, and a user equipment.

BACKGROUND

In the field of radio communications technologies, before Coordinated Multiple Point transmission and reception (CoMP) is introduced, for each user equipment (UE) on one carrier, the UE can only be triggered to perform at most one aperiodic channel-state information (CSI) measurement feedback at a time, and a CSI reference resource is defined, where a reference resource for aperiodic CSI reporting is right in a subframe that receives a CSI request, and a time interval to CSI reporting is 4 ms. Since only one piece of CSI is configured on one carrier at a time, when reporting the CSI, the UE has an enough capability to complete measurement and calculation of all CSI configured by a base station, and to report a result.

However, after the CoMP technology is introduced, multiple CSI processes may be configured for one UE on one carrier, where a CSI process is associated with a channel measurement resource and an interference measurement resource, and reporting of one piece of CSI is associated with a CSI process, for example, processing of multiple aperiodic CSI processes. At this time, a problem exists that the UE cannot complete processing CSI configured by the base station.

SUMMARY

Embodiments of the present invention provide a channel-state information process processing method, a network device, and a user equipment, which are used to solve a problem existing in the prior art that a UE cannot complete processing CSI configured by a base station.

A first aspect of the present invention provides a channel-state information process processing method, including:
  after receiving a first channel-state information CSI request sent by a first network device, where the first CSI request is used to trigger aperiodic CSI reporting, if CSI corresponding to multiple aperiodic CSI processes has not been reported by the user equipment, dropping CSI corresponding to a part of aperiodic CSI processes among the multiple aperiodic CSI processes, where each CSI process is associated with a channel measurement resource and an interference measurement resource.

The aperiodic CSI processes are CSI processes for aperiodic CSI reporting.

The dropping CSI corresponding to a part of aperiodic CSI processes among the multiple aperiodic CSI processes is dropping reporting of the CSI corresponding to the part of aperiodic CSI processes among the multiple aperiodic CSI processes.

The multiple aperiodic CSI processes are aperiodic CSI processes corresponding to the first CSI request. Alternatively, before the receiving a first CSI request sent by a first network device, the method further includes: receiving a second CSI request, where the multiple aperiodic CSI processes are aperiodic CSI processes corresponding to the first CSI request and aperiodic CSI processes corresponding to the second CSI request.

The dropping CSI corresponding to a part of aperiodic CSI processes among the multiple aperiodic CSI processes includes:
  if the number of the multiple aperiodic CSI processes exceeds a first threshold, dropping the CSI corresponding to the part of aperiodic CSI processes among the multiple aperiodic CSI processes.

The first threshold is predefined, or is notified by the first network device, or is notified by the second network device.

The dropping CSI corresponding to a part of aperiodic CSI processes among the multiple aperiodic CSI processes includes:
  dropping, according to a dropping rule or priority, the CSI corresponding to the part of aperiodic CSI processes among the multiple aperiodic CSI processes corresponding to the first CSI request; or
  dropping CSI corresponding to all aperiodic CSI processes corresponding to the first CSI request, where the CSI corresponding to all aperiodic CSI processes corresponding to the first CSI request is the CSI corresponding to the part of aperiodic CSI processes.

Further, the dropping CSI corresponding to a part of aperiodic CSI processes among the multiple aperiodic CSI processes includes: dropping, according to a dropping rule or priority, the channel-state information of the part of aperiodic CSI processes among the multiple aperiodic CSI processes corresponding to the first CSI request and the second CSI request; or
  dropping CSI corresponding to all aperiodic CSI processes corresponding to the first CSI request, where the CSI corresponding to all aperiodic CSI processes corresponding to the first CSI request is the CSI corresponding to the part of aperiodic CSI processes.

In another implementation manner, the dropping CSI corresponding to a part of aperiodic CSI processes among the multiple aperiodic CSI processes includes:
  dropping CSI corresponding to a part of aperiodic CSI processes according to the number of aperiodic CSI processes with corresponding CSI not reported by the user equipment and a CSI process processing capability of the user equipment.

The CSI process processing capability of the user equipment is a predefined CSI process processing capability of the user equipment or a minimum CSI process processing capability of each user equipment.

Specifically, the CSI process processing capability of the user equipment is processing N CSI processes per ms, or is processing K CSI processes per M ms, where N is a positive number, and M and K are positive integers. The CSI process processing capability of the user equipment may include multiple capability levels, where different capability levels correspond to different N values, or correspond to different combinations of M values and K values.

Further, the method may further include:
reporting the CSI process processing capability of the user equipment to the first network device or a second network device.

Further, the method may further include:
sending CSI obtained through measurement to the first network device or the second network device, where CSI corresponding to dropped processing of aperiodic CSI processes is replaced by a previous measurement result or is replaced by a preset first sequence, and the preset first sequence represents that the user equipment drops the aperiodic CSI processes. The preset first sequence is an all-0 sequence or an all-1 sequence.

An embodiment of the present invention further provides another channel-state information process processing method, including: sending a first channel-state information CSI request to a user equipment, where the first CSI request is used to trigger aperiodic CSI reporting; and
receiving CSI obtained by the user equipment through measurement, where the CSI is obtained after dropping CSI corresponding to a part of aperiodic CSI processes among multiple aperiodic CSI processes when CSI corresponding to multiple aperiodic CSI processes has not been reported by the user equipment, where each CSI process is associated with a channel measurement resource and an interference measurement resource.

The aperiodic CSI processes are CSI processes for aperiodic CSI reporting.

The dropping CSI corresponding to a part of aperiodic CSI processes among the multiple aperiodic CSI processes is dropping reporting of the CSI corresponding to the part of aperiodic CSI processes among the multiple aperiodic CSI processes.

The user equipment drops CSI corresponding to a part of aperiodic CSI processes among the multiple aperiodic CSI processes when the number of the multiple aperiodic CSI processes exceeds a first threshold, or drops CSI corresponding to a part of aperiodic CSI processes according to the number of aperiodic CSI processes not reported by the user equipment and a CSI process processing capability of the user equipment.

The CSI process processing capability of the user equipment is processing N CSI processes per ms, or is processing K CSI processes per M ms, where N is a positive number, and M and K are positive integers. Alternatively, the CSI process processing capability of the user equipment includes multiple capability levels, where different capability levels correspond to different N values, or correspond to different combinations of M values and K values.

An embodiment of the present invention further provides a channel-state information process processing method, including:
receiving a first channel-state information CSI request sent by a first network device, where the first CSI request is used to trigger aperiodic CSI reporting; and
if CSI corresponding to multiple aperiodic CSI processes has not been reported by the user equipment, dropping processing of a part of information in a part of aperiodic CSI processes, where each CSI process is associated with a channel measurement resource and an interference measurement resource, and the part of information in the aperiodic CSI processes includes at least one of a channel quality indication, a precoding matrix indication, a precoding type indication, or a rank indication.

The method may further include:
receiving first dropping indication information sent by the first network device, where the first dropping indication information carries a limit value of at least one of information of the part of aperiodic CSI processes; or
receiving second dropping indication information sent by the first network device, where the second dropping indication information is used to indicate reporting at least one of information of the part of aperiodic CSI processes by using a measurement value reported last time.

An embodiment of the present invention further provides a channel-state information process processing method, including:
sending a first channel-state information CSI request to a user equipment, where the first CSI request is used to trigger aperiodic CSI reporting; and
receiving CSI obtained by the user equipment through measurement, where the CSI is obtained after dropping processing of a part of information in a part of aperiodic CSI processes when CSI corresponding to multiple aperiodic CSI processes has not been reported by the user equipment, where each CSI process is associated with a channel measurement resource and an interference measurement resource, and the part of information in the aperiodic CSI processes includes at least one of a channel quality indication, a precoding matrix indication, a precoding type indication, or a rank indication.

The method may further include:
sending first dropping indication information to the user equipment, where the first dropping indication information carries a limit value of at least one of information of the part of aperiodic CSI processes; or
sending second dropping indication information to the user equipment, where the second dropping indication information is used to indicate reporting at least one of information of the part of aperiodic CSI processes by using a measurement value reported last time.

An embodiment of the present invention further provides a channel-state information process processing method, including: sending a first channel-state information CSI request to a user equipment, where the first CSI request is used to trigger aperiodic CSI reporting, and a time interval for sending the first CSI request is no less than a first time interval,
where the first time interval is a predefined time interval, or the method further includes:
sending a notification message carrying the first time interval to the user equipment.

An embodiment of the present invention further provides a channel-state information process processing method, including:
receiving a first channel-state information CSI request sent by a first network device, and assuming that a time interval that the first network device sends the first CSI request is no less than a first time interval.

The assuming that a time interval that the first network device sends the first CSI request is no less than a first time interval includes:
after receiving the first CSI request sent by the first network device, dropping other first CSI requests received in the first time interval.

The first time interval is predefined, or is notified by the first network device, and the first time interval is W subframes, where W is a positive integer.

An embodiment of the present invention further provides a channel-state information process processing method, including:

receiving, by a user equipment, a first channel-state information CSI request sent by a first network device, and dropping, by the user equipment, all CSI requests received in a second time interval before next CSI reporting.

The second time interval is predefined, or is notified by the first network device, and the first time interval is W subframes, where W is a positive integer.

An embodiment of the present invention further provides a channel-state information process processing method, including:

obtaining, by a user equipment, a CSI process, where the CSI process corresponds to a CSI reference resource, and in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment; and processing, by the user equipment, the CSI process according to the CSI reference resource.

In the foregoing embodiment, the subframe of the ZP CSI-RS resource configured for the user equipment is a subframe of the ZP CSI-RS resource, which has a minimum period and is configured for the user equipment; or in a time domain, the CSI reference resource is a subframe including an NZP CSI-RS resource corresponding to the CSI process and/or a subframe including a CSI-IM resource corresponding to the CSI process, which specifically is:

if a period of the NZP CSI-RS resource corresponding to the CSI process is greater than a period of the CSI-IM resource corresponding to the CSI process, in the time domain, the CSI reference resource is the subframe including the CSI-IM resource corresponding to the CSI process, otherwise, in the time domain, the CSI reference resource is the subframe including the NZP CSI-RS resource corresponding to the CSI process; or if a period of the NZP CSI-RS resource corresponding to the CSI process is equal to a period of the CSI-IM resource corresponding to the CSI process, in the time domain, the CSI reference resource is the subframe including the NZP CSI-RS resource corresponding to the CSI process and/or the subframe including the CSI-IM resource corresponding to the CSI process.

The CSI reference resource is predefined, or the method further includes:

receiving, by the user equipment, CSI reference resource indication information sent by a first network device, where the CSI reference resource indication information is used to indicate that, in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment.

An embodiment of the present invention further provides a channel-state information process processing method, including: obtaining, by a user equipment, at least two CSI processes, where the at least two CSI processes correspond to a CSI reference resource, and in a time domain, the CSI reference resource is any one or a combination of a subframe including an NZP CSI-RS resource, a subframe including a CSI-IM resource, or a subframe including a ZP CSI-RS resource; and processing, by the user equipment, the CSI processes according to the CSI reference resource.

If the reference resource includes an NZP CSI-RS resource or a CSI-IM resource in the time domain, the NZP CSI-RS resource or the CSI-IM resource has a minimum period or a minimum subframe offset among NZP CSI-RS resources and CSI-IM resources respectively corresponding to the at least two CSI processes;

if the CSI reference resource includes an NZP CSI-RS resource in the time domain, the NZP CSI-RS resource has a minimum period or a minimum subframe offset among NZP CSI-RS resources respectively corresponding to the at least two CSI processes;

if the CSI reference resource includes an NZP CSI-IM resource in the time domain, the NZP CSI-IM resource has a minimum period or a minimum subframe offset among NZP CSI-IM resources respectively corresponding to the at least two CSI processes; or if the reference resource includes a ZP CSI-RS resource in the time domain, the ZP CSI-RS resource has a minimum period or a minimum subframe offset among ZP CSI-RS resources configured for the user equipment.

The CSI reference resource is predefined, or the method further includes:

receiving, by the user equipment, CSI reference resource indication information sent by a first network device, where the CSI reference resource indication information is used to indicate that, in a time domain, the CSI reference resource is any one or a combination of a subframe including an NZP CSI-RS resource, a subframe including a CSI-IM resource, or a subframe including a ZP CSI-RS resource.

An embodiment of the present invention further provides a channel-state information process processing method, including:

obtaining, by a user equipment, a CSI process, where the CSI process corresponds to at least two CSI reference resources.

In the at least two CSI reference resources, at least one CSI reference resource is a reference resource of a CQI channel part in the CSI process, and is a subframe including an NZP CSI-RS resource corresponding to the CSI process in a time domain; and at least one CSI reference resource is a reference resource of a CQI interference part in the CSI process, and is a subframe including a CSI-IM resource corresponding to the CSI process in a time domain.

An embodiment of the present invention further provides a channel-state information process processing method, including: obtaining, by a user equipment, a CSI process, where a CSI reference resource corresponding to the CSI process is multiple subframes in a time domain.

The multiple subframes are L subframes before a subframe triggering the CSI process or include the subframe triggering the CSI process and L−1 subframes before the subframe triggering the CSI process, where L is a positive integer.

An embodiment of the present invention further provides a user equipment, including:
  a first receiving module, configured to receive a first channel-state information CSI request sent by a first network device, where the first CSI request is used to trigger aperiodic CSI reporting; and
  a first measurement processing module, configured to: when CSI corresponding to multiple aperiodic CSI processes has not been reported by the user equipment, drop CSI corresponding to a part of aperiodic CSI processes among the multiple aperiodic CSI processes, where each CSI process is associated with a channel measurement resource and an interference measurement resource.

An embodiment of the present invention further provides a network device, including:
  a third sending module, configured to send a first channel-state information CSI request to a user equipment; and
  a second receiving module, configured to receive CSI obtained by the user equipment through measurement, where the CSI is obtained after dropping CSI corresponding to a part of aperiodic CSI processes among multiple aperiodic CSI processes when CSI corresponding to multiple aperiodic CSI processes has not been reported by the user equipment, corresponding to the multiple aperiodic CSI processes, where each CSI process is associated with a channel measurement resource and an interference measurement resource.

An embodiment of the present invention further provides a user equipment, including:
  a third receiving module, configured to receive a first channel-state information CSI request sent by a first network device, where the first CSI request is used to trigger aperiodic CSI reporting; and
  a second measurement processing module, configured to: when CSI corresponding to multiple aperiodic CSI processes has not been reported by a user equipment, drop processing of a part of information in a part of aperiodic CSI processes, where each CSI process is associated with a channel measurement resource and an interference measurement resource, and the part of information in the aperiodic CSI processes includes at least one of a channel quality indication, a precoding matrix indication, a precoding type indication, or a rank indication.

An embodiment of the present invention further provides a network device, including:
  a fourth sending module, configured to send a first channel-state information CSI request to a user equipment, where the first CSI request is used to trigger aperiodic CSI reporting; and
  a fourth receiving module, configured to receive CSI obtained by the user equipment through measurement, where the CSI is obtained after dropping processing of a part of information in a part of aperiodic CSI processes when CSI corresponding to multiple aperiodic CSI processes has not been reported by the user equipment, where each CSI process is associated with a channel measurement resource and an interference measurement resource, and the part of information in the aperiodic CSI processes includes at least one of a channel quality indication, a precoding matrix indication, a precoding type indication, or a rank indication.

An embodiment of the present invention further provides a network device, including:
  a fifth sending module, configured to send a first channel-state information CSI request to a user equipment, a time interval for sending the first CSI request being no less than a first time interval, where the first time interval is a predefined time interval, or the fifth sending module is further configured to send a notification message carrying the first time interval to the user equipment.

An embodiment of the present invention further provides a user equipment, including:
  a fifth receiving module, configured to receive a first channel-state information CSI request sent by a first network device, where the first CSI request is used to trigger aperiodic CSI reporting, and assume that a time interval that the first network device sends the first CSI request is no less than a first time interval.

An embodiment of the present invention further provides a user equipment, including:
  a sixth receiving module, configured to receive a first channel-state information CSI request sent by a first network device, and drop all CSI requests received in a second time interval before next CSI reporting.

An embodiment of the present invention further provides a user equipment, including:
  a first obtaining module, configured to obtain a CSI process, where the CSI process corresponds to a CSI reference resource, and in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment; and
  a first processing module, configured to process the CSI process according to the CSI reference resource.

An embodiment of the present invention further provides a network device, including:
  a second obtaining module, configured to obtain at least two CSI processes, where the at least two CSI processes correspond to a CSI reference resource, and in a time domain, the CSI reference resource is any one or a combination of a subframe including an NZP CSI-RS resource, a subframe including a CSI-IM resource, or a subframe including a ZP CSI-RS resource; and
  a second processing module, configured to process the CSI processes according to the CSI reference resource.

An embodiment of the present invention further provides a user equipment, including:
  a third obtaining module, configured to obtain a CSI process, where the CSI process corresponds to at least two CSI reference resources.

In the at least two CSI reference resources, at least one CSI reference resource is a reference resource of a CQI channel part in the CSI process, and is a subframe including an NZP CSI-RS resource corresponding to the CSI process in a time domain; and at least one CSI reference resource is a reference resource of a CQI interference part in the CSI process, and is a subframe including a CSI-IM resource corresponding to the CSI process in a time domain.

An embodiment of the present invention further provides a user equipment, including: a fourth obtaining module, configured to obtain a CSI process, where a CSI reference resource corresponding to the CSI process is multiple subframes in a time domain.

The multiple subframes are L subframes before a subframe triggering the CSI process or include the subframe triggering the CSI process and L−1 subframes before the subframe triggering the CSI process, where L is a positive integer.

In the channel-state information process processing method, the network device, the base station, and the user equipment provided in the embodiments of the present invention, after receiving a first channel-state information request sent by the base station, the UE drops the processing of a part of CSI processes, thereby solving the problem existing after a CoMP technology is introduced that the UE cannot implement processing of multiple CSI processes.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
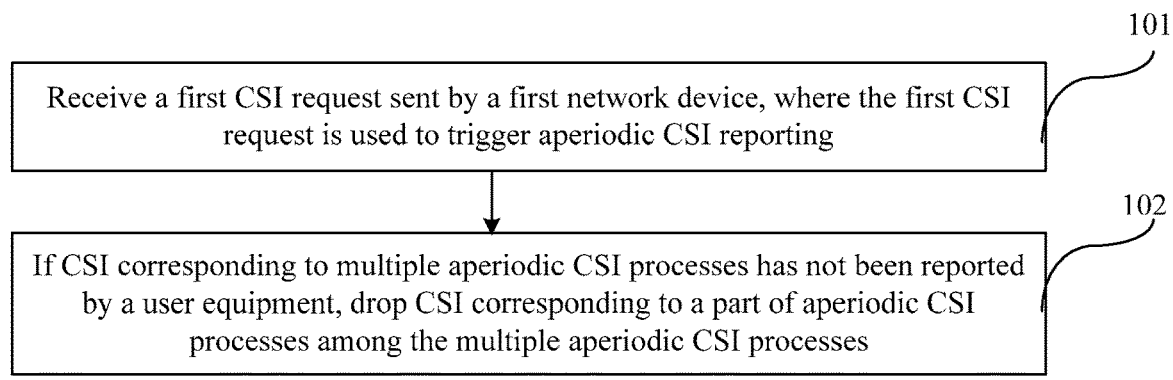
FIG. 1 is a first schematic flowchart of a CSI process processing method according to an embodiment of the present invention.

In view of the problem existing in the prior art that after the CoMP technology is introduced that a UE cannot process CSI configured by a base station, the embodiments of the present invention provide a technical solution. FIG. 1 is a first schematic flowchart of a CSI process processing method according to an embodiment of the present invention. As shown in FIG. 1, the method includes the following steps.

Step 101: Receive a first CSI request sent by a first network device, where the first CSI request is used to trigger aperiodic CSI reporting. Specifically, in the embodiment of the present invention, the first channel-state information request may instruct a user equipment to measure channel-state information, and one first channel-state information request may instruct the user equipment to drop multiple channel-state information processes, where each CSI process is associated with a channel measurement resource and an interference measurement resource.

Step 102: If CSI corresponding to multiple CSI processes has not been reported by the user equipment for aperiodic CSI reporting, drop CSI corresponding to a part of aperiodic CSI processes among the multiple aperiodic CSI processes. Specifically, the aperiodic CSI processes are CSI processes for aperiodic CSI reporting. Dropping CSI corresponding to a part of aperiodic CSI processes among the multiple aperiodic CSI processes is dropping reporting of the CSI corresponding to the part of aperiodic CSI processes among the multiple aperiodic CSI processes.

In the foregoing embodiment of the present invention, after receiving the first channel-state information request sent by the first network device, the UE drops the CSI corresponding to a part of CSI processes, thereby solving the problem existing after a CoMP technology is introduced that the UE cannot implement processing of multiple CSI processes.

Specifically, in the foregoing embodiment, the multiple aperiodic CSI processes may be aperiodic CSI processes corresponding to the first CSI request. Alternatively, before the receiving a first channel-state information request sent by a first network device, the method further includes: receiving a second channel-state information request, and the multiple aperiodic CSI processes are aperiodic CSI processes, which are not reported, corresponding to the first channel-state information request and aperiodic CSI processes, which are not reported, corresponding to the second channel-state information request.

Processing of the dropping a part of aperiodic CSI processes among the multiple aperiodic CSI processes may be carried out in two situations. First, if the number of the multiple aperiodic CSI processes exceeds a first threshold, a part of aperiodic CSI processes among the multiple aperiodic CSI processes are dropped. Second, a part of aperiodic CSI processes are dropped according to the number of aperiodic CSI processes not reported by the user equipment and a CSI process processing capability of the user equipment. Dropping the CSI processes may be dropping reporting of CSI corresponding to the CSI processes.

In the first situation, the dropping a part of aperiodic CSI processes among the multiple aperiodic CSI processes includes: dropping the CSI corresponding to the part of aperiodic CSI processes, so that the number of aperiodic CSI processes not dropped among the multiple aperiodic CSI processes is less than or equal to the first threshold. The first threshold may be a predefined threshold, that is, the first threshold is configured on the base station and the UE in advance when a communications system is pre-configured. When receiving a channel-state information request, the user equipment may perform comparison according to the predefined threshold and the number of channel-state information processes not reported. In addition, the first threshold may further be notified by the first network device, or notified by a second network device.

In addition, the dropping CSI corresponding to a part of aperiodic CSI processes among the multiple aperiodic CSI processes includes:

dropping, according to a dropping rule or priority, the CSI corresponding to the part of aperiodic CSI processes among the multiple aperiodic CSI processes corresponding to the first CSI request; or dropping CSI corresponding to all aperiodic CSI processes corresponding to the first CSI request, where the CSI corresponding to all aperiodic CSI processes corresponding to the first CSI request is the CSI corresponding to the part of aperiodic CSI processes.

In addition, in the foregoing embodiment of the present invention, the dropping CSI corresponding to a part of aperiodic CSI processes among the multiple aperiodic CSI processes includes:

dropping, according to a dropping rule or priority, the CSI corresponding to the part of aperiodic CSI processes among the multiple aperiodic CSI processes corresponding to the first CSI request and the second CSI request; or dropping CSI corresponding to all aperiodic CSI processes corresponding to the first CSI request, where the CSI corresponding to all aperiodic CSI processes corresponding to the first CSI request is the CSI corresponding to the part of aperiodic CSI processes. In the foregoing embodiment of the present invention, the dropping rule includes any one or several of the following four items:

dropping CSI corresponding to an aperiodic CSI process with a minimum index number or CSI corresponding to an aperiodic CSI process with a maximum index number; dropping CSI corresponding to an aperiodic CSI process that is triggered first or CSI corresponding to an aperiodic CSI process that is triggered last; dropping CSI corresponding to an aperiodic CSI process with longest time since last feedback or CSI corresponding to an aperiodic CSI process with shortest time since last feedback; and dropping CSI corresponding to an aperiodic CSI process with a highest feedback frequency or CSI corresponding to an aperiodic CSI process with a lowest feedback frequency; and CSI corresponding to an aperiodic CSI process with a low priority is dropped first, and the priority includes any one or several of the following four items: a priority of CSI corresponding to an aperiodic CSI process with a small index number is higher than that of CSI corresponding to an aperiodic CSI process with a large index number or a priority of CSI corresponding to an aperiodic CSI process with a large index number is higher than that of CSI corresponding to an aperiodic CSI process with a small index number, a priority of CSI corresponding to an aperiodic CSI process triggered earlier is higher than that of CSI corresponding to an aperiodic CSI process triggered later or a priority of CSI corresponding to an aperiodic CSI process triggered later is higher than that of CSI corresponding to an aperiodic CSI process triggered earlier, a priority of CSI corresponding to an aperiodic CSI process with a long time since last feedback is higher than that of CSI corresponding to an aperiodic CSI process with a short time since last feedback or a priority of CSI corresponding to an aperiodic CSI process with a short time since last feedback is higher than that of CSI corresponding to an aperiodic CSI process with a long time since last feedback, and a priority of CSI corresponding to an aperiodic CSI process with a high feedback frequency is higher than that of CSI corresponding to an aperiodic CSI process with a low feedback frequency or a priority of CSI corresponding to an aperiodic CSI process with a low feedback frequency is higher than that of CSI corresponding to an aperiodic CSI process with a high feedback frequency.

In a multi-carrier situation, priority at two dimensions of carrier and CSI process may be considered concurrently, and a CSI process with a low priority is dropped first. At this time, for all CSI processes, carrier index numbers of CSI processes are compared firstly, and then CSI process index numbers are compared, and a CSI process with a low priority will be dropped first.

The technical solution of the present invention may be summarized to include three basic solutions:

first, when the UE receives a CSI request, if the UE has already received at least one CSI request before, and CSI corresponding to aperiodic CSI processes corresponding to the at least one CSI request is not yet reported, and at this time, if the number of all aperiodic CSI processes, with corresponding CSI not reported, including CSI processes corresponding to the newly received CSI request, exceeds a threshold K, the UE drops processing of a part of aperiodic CSI processes according to a dropping rule or priority of each CSI, so that the number of aperiodic CSI processes, which are not dropped, with corresponding CSI not reported is no greater than the threshold K;

second, when the UE receives a CSI request, if the UE has not received other CSI requests before, that is, a situation does not exist that CSI processes corresponding to other CSI requests are not yet reported, and at this time, if the number of aperiodic CSI processes corresponding to a newly received CSI request, that is, all aperiodic CSI processes with corresponding CSI not reported, exceeds a threshold K, the UE drops processing of a part of aperiodic CSI processes according to a dropping rule or priority of each CSI, so that the number of CSI processes, which are not dropped, with corresponding CSI not reported is no greater than the threshold K; and third, when the UE receives a CSI request, if the UE has already received at least one CSI request before, and CSI corresponding to aperiodic CSI processes corresponding to the at least one CSI request is not yet reported, and at this time, if the number of all aperiodic CSI processes, with corresponding CSI not reported, including aperiodic CSI processes corresponding to the newly received CSI request, exceeds a threshold K, the UE drops processing of all the aperiodic CSI processes corresponding to the newly received CSI request.

In the foregoing description, the CSI corresponding to a part of aperiodic CSI processes may be dropped according to the number of aperiodic CSI processes not reported by the user equipment and the CSI process processing capability of the user equipment, where the CSI process processing capability of the user equipment is a predefined CSI process processing capability of the user equipment or a minimum CSI process processing capability of each user equipment.

Specifically, the CSI process processing capability of the UE is processing N channel-state information processes per ms, or is processing K channel-state information processes per M ms, where N is a positive number, and both M and K are positive integers.

For the processing capability of the UE, the CSI process processing capability of the UE may be divided into multiple capability levels according to a factor such as a type of the UE, where different capability levels correspond to different N values, or correspond to different combinations of M values and K values. For example, for a first level, N=1, and for a second level, N=2; or for a first level, K=1, and M=4, and for a second level, K=2, and M=4.

In a specific implementation manner, the CSI process processing capability of the UE may also be defined respectively for different carriers. For example, for a carrier with a bandwidth of 5 MHz, N=3, and for a carrier with a bandwidth of 20 MHz, N=1.

In the foregoing embodiment of the present invention, the method may further include the following step:

reporting, by the UE, the CSI process processing capability of the user equipment to the first network device or the second network device.

In the technical solution, though the UE reports and sends the CSI process processing capability to the network device, for the network device, there are two types of specific processing, first, the base station performs CSI configuration for the UE according to the processing capability of the UE, thereby preventing the CSI process configured for the UE from exceeding the process processing capability; and second, the base station cannot be constrained, and may still configure CSI processes exceeding the processing capability for the UE according to actual requirements.

In the foregoing embodiment of the present invention, when it is predefined that the CSI process processing capability of the UE is processing N CSI processes per ms, or is processing K channel-state information processes per M ms, and if the CSI process processing capability configured by the base station for the UE is processing N+n CSI processes per ms, or the CSI process processing capability configured for the UE is processing K+L CSI processes per M ms. At this time, the UE may drop, according to a dropping rule or priority, processing of a part of channel-state information not reported, which is similar to the method in the technical solution. Specifically, processing of n*T CSI processes may be dropped (where T is milliseconds for processing the CSI), or processing of L CSI processes may be dropped, to achieve a purpose that the processing capability of the UE can finish processing the remaining CSI processes, which are not reported. For the base station, since the processing capability of the UE is predefined, or the UE reports the processing capability of the UE, when configuring CSI processes exceeding the processing capability for the UE, the base station can believe that the UE will drop the CSI processes that exceeds the processing capability instead of processing the CSI processes, thereby unifying the base station and the UE.

In addition, in the foregoing embodiment of the present invention, the method may further include the following step:

sending CSI obtained through measurement to the first network device or the second network device, where CSI corresponding to dropped processing of aperiodic CSI processes is replaced by a previous measurement result or is replaced by a preset first sequence, and the preset first sequence represents that the user equipment drops the aperiodic CSI processes.

Specifically, the preset first sequence is an all-0 sequence or an all-1 sequence, or is another sequence.

In addition, when CSI corresponding to multiple periodic CSI processes has not been reported further by the user equipment in addition to the CSI corresponding to the multiple aperiodic CSI processes has not been reported, the user equipment drops CSI, which has not been reported, corresponding to a part of CSI processes. In addition, when the total number of periodic CSI processes and aperiodic CSI processes, which are not reported by the user equipment, exceeds the first threshold, a part of CSI corresponding to the periodic CSI processes and/or CSI corresponding to the aperiodic CSI processes is dropped. The periodic CSI processes herein are CSI processes for periodic CSI reporting.

Figure 2:
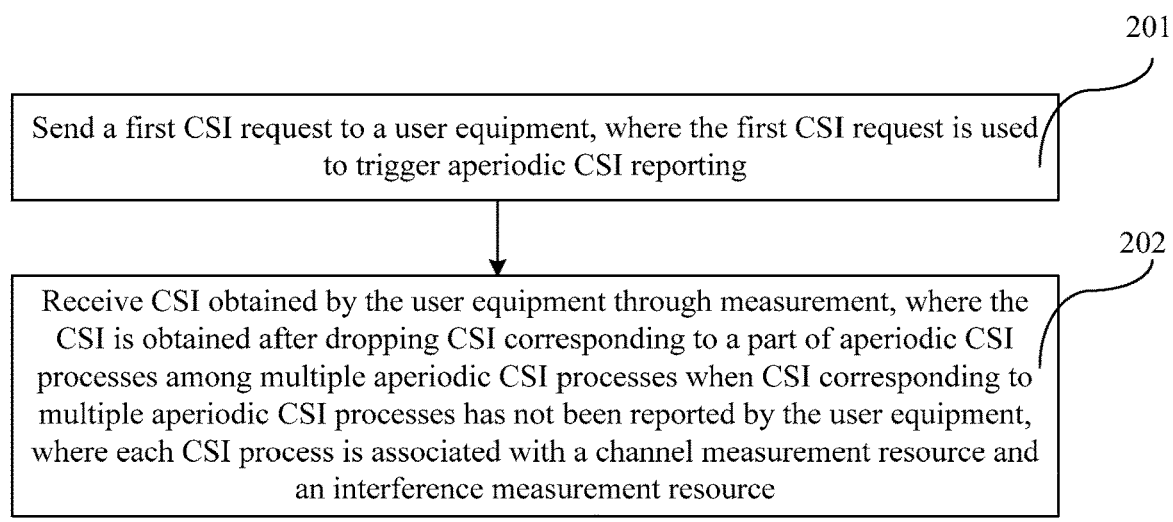
FIG. 2 is a second schematic flowchart of a CSI process processing method according to an embodiment of the present invention.

Corresponding to the foregoing embodiment, an embodiment of the present invention further provides a channel-state information process processing method, FIG. 2 is a second schematic flowchart of a CSI process processing method according to an embodiment of the present invention. As shown in FIG. 2, the method includes the following steps.

Step 201: Send a first CSI request to a user equipment, where the first CSI request is used to trigger aperiodic CSI reporting.

Step 202: Receive CSI obtained by the user equipment through measurement, where the CSI is obtained after dropping CSI corresponding to a part of aperiodic CSI processes among multiple aperiodic CSI processes when CSI corresponding to the multiple aperiodic CSI processes has not been reported by the user equipment, where each CSI process is associated with a channel measurement resource and an interference measurement resource.

In the foregoing embodiment, the aperiodic CSI processes are CSI processes for aperiodic CSI reporting. A network device sends the first CSI request to the user equipment, and then receives the CSI obtained by the user equipment through measurement, where the CSI is obtained after dropping CSI corresponding to a part of aperiodic CSI processes among multiple aperiodic CSI processes when CSI corresponding to the multiple aperiodic CSI processes has not been reported by the user equipment, thereby solving the problem existing after a CoMP technology is introduced that the UE cannot implement processing of multiple CSI.

In the foregoing embodiment of the present invention, the dropping CSI corresponding to a part of aperiodic CSI processes among the multiple aperiodic CSI processes is dropping reporting of the CSI corresponding to the part of aperiodic CSI processes among the multiple aperiodic CSI processes, where CSI corresponding to dropped processing of aperiodic CSI processes is replaced by a previous measurement result or is replaced by a preset first sequence, and the preset first sequence represents that the user equipment drops the aperiodic CSI processes. The preset first sequence is an all-0 sequence or an all-1 sequence.

In addition, in the foregoing embodiment of the present invention, the user equipment drops CSI corresponding to a part of aperiodic CSI processes among the multiple aperiodic CSI processes when the number of the multiple aperiodic CSI processes exceeds a first threshold, or drops CSI corresponding to a part of aperiodic CSI processes according to the number of aperiodic CSI processes not reported by the user equipment and a CSI process processing capability of the user equipment.

Further, the method may further include the following step: sending, by the network device, the first threshold to the user equipment.

In addition, in the foregoing embodiment of the present invention, the method may further include the following step: receiving the CSI process processing capability reported by the user equipment. The CSI process processing capability of the user equipment is processing N CSI processes per ms, or is processing K CSI processes per M ms, where N is a positive number, and M and K are positive integers. In addition, the CSI process processing capability of the user equipment includes multiple capability levels, where different capability levels correspond to different N values, or correspond to different combinations of M values and K values.

Figure 3:
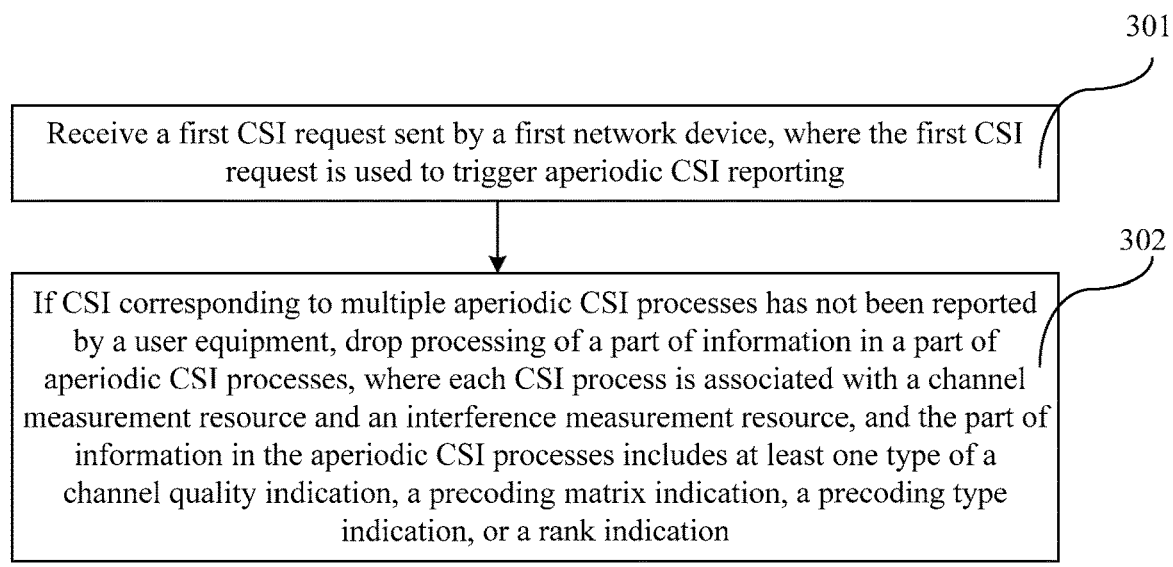
FIG. 3 is a third schematic flowchart of a CSI process processing method according to an embodiment of the present invention.

An embodiment of the present invention further provides a channel-state information process processing method. FIG. 3 is a third schematic flowchart of a CSI process processing method according to an embodiment of the present invention. As shown in FIG. 3, the method includes the following steps.

Step 301: Receive a first CSI request sent by a first network device, where the first CSI request is used to trigger aperiodic CSI reporting.

Step 302: If CSI corresponding to multiple aperiodic CSI processes has not been reported by a user equipment, drop processing of a part of information in a part of aperiodic CSI processes, where each CSI process is associated with a channel measurement resource and an interference measurement resource, and the part of information in the aperiodic CSI processes includes at least one of a channel quality indication, a precoding matrix indication, a precoding type indication, or a rank indication.

Different from the embodiment shown in FIG. 1, in this embodiment, processing of a part of information in a part of channel-state information processes is dropped. Specifically, for one piece of CSI, it may include at least one of a channel quality indication, a precoding matrix indication, a precoding type indication, or a rank indication, and the dropping processing of a part of information in a part of channel-state information process information may specifically be dropping processing of at least one of the channel quality indication, the precoding matrix indication, the precoding type indication, or the rank indication. The aperiodic CSI processes are CSI processes for aperiodic CSI reporting.

In the foregoing embodiment of the present invention, specifically, dropping processing of which information may be predefined, or a base station notifies the UE of it, or the UE applies to the base station for it, or it is set that the UE reports it to the base station. Specifically, conditions may be set for each piece of information, and it is selected, according to the set conditions, whether to process corresponding information. For example, an RI value can be set as a subset of optional RI values, for example, if RI=1, it is unnecessary to try other RIs when the CSI process is processed; a PMI value also can be set as a subset of optional PMI values, for example, if PMI={1, 2, 3}, it is unnecessary to try other PMIs when the CSI process is processed; or the RI value is set as a subset of optional RI values, and the PMI value is set as a subset of optional PMI values, for example, if RI=1 and PMI=5, it is unnecessary to try other RIs and PMIs when the CSI process is processed. Definitely, the set conditions may also be predefined.

Limiting information of each piece of information in the present invention is specifically for a situation where the processing capability is limited, and is information added on the basis of CSI configuration. When the UE is capable of processing all CSI processes, the UE may select to use information in the CSI configuration or the limiting information. When the UE is incapable of processing all CSI processes, the UE must use the limiting information.

As it is selected, according to the set conditions, whether to process corresponding information in the foregoing, the foregoing embodiment of the present invention may further include a step of:

receiving first dropping indication information sent by the first network device, where the first dropping indication information carries a limit value of at least one of information of the part of aperiodic CSI processes.

Specifically, similar to the foregoing embodiment, when a measurement result is reported, the part of dropped information in the channel-state information processes may be replaced by a preset first sequence, and the preset first sequence represents that the user equipment does not process the part of information. The preset first sequence is an all-0 sequence or an all-1 sequence, or is another sequence.

There is another manner, which is reporting one or more types of the channel-state information by using a measurement value reported last time. At this time, the method may further include:

receiving second dropping indication information sent by the first network device, where the second dropping indication information is used to indicate reporting at least one of information of the part of aperiodic CSI processes by using a measurement value reported last time.

Figure 4:
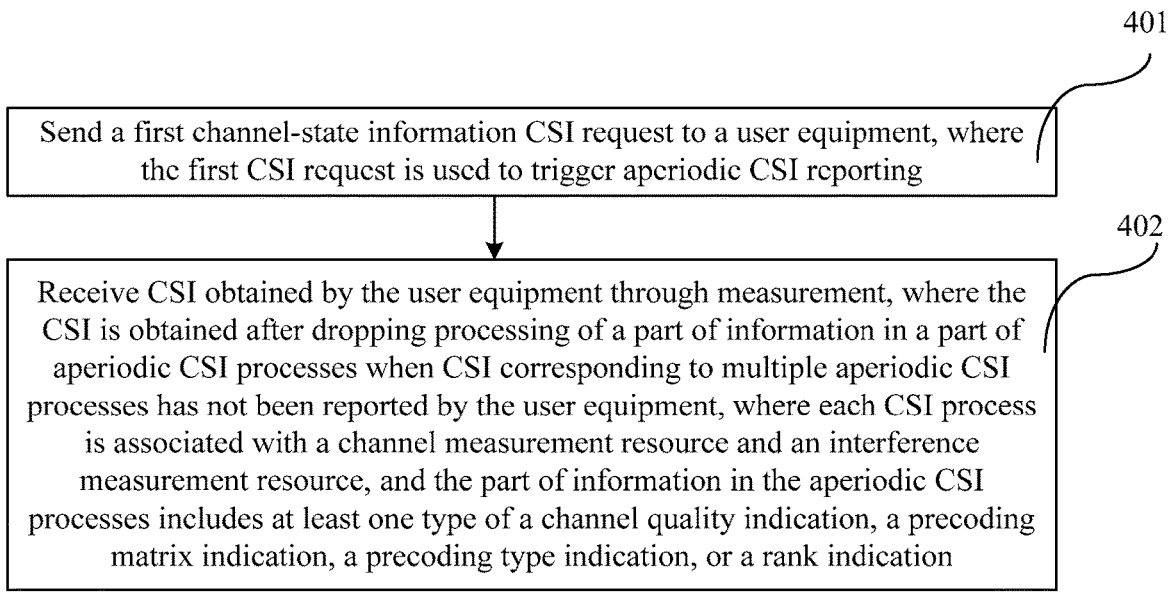
FIG. 4 is a fourth schematic flowchart of a CSI process processing method according to an embodiment of the present invention.

An embodiment of the present invention further provides a method, and the method is a method of a network device corresponding to the foregoing embodiment shown in FIG. 3. FIG. 4 is a fourth schematic flowchart of a CSI process processing method according to an embodiment of the present invention. As shown in FIG. 4, the method includes the following steps.

Step 401: Send a first channel-state information CSI request to a user equipment, where the first CSI request is used to trigger aperiodic CSI reporting.

Step 402: Receive CSI obtained by the user equipment through measurement, where the CSI is obtained after dropping processing of a part of information in a part of aperiodic CSI processes when CSI corresponding to the multiple aperiodic CSI processes has not been reported by the user equipment, where each CSI process is associated with a channel measurement resource and an interference measurement resource, and the part of information in the aperiodic CSI processes includes at least one of a channel quality indication, a precoding matrix indication, a precoding type indication, or a rank indication.

The aperiodic CSI processes are CSI processes for aperiodic CSI reporting.

The method may further include the following step:

sending first dropping indication information to the user equipment, where the first dropping indication information carries a limit value of at least one of information of the part of aperiodic CSI processes; or sending second dropping indication information to the user equipment, where the second dropping indication information is used to indicate reporting at least one of information of the part of aperiodic CSI processes by using a measurement value reported last time.

An embodiment of the present invention further provides another channel-state information process processing method. In the method, a network device sends a first channel-state information CSI request to a user equipment, and a time interval for sending the first CSI request is no less than a first time interval. The first time interval is a predefined time interval, or the method may further include: sending a notification message carrying the first time interval to the user equipment. That is, the network device will not configure CSI for the UE for successive two times in the first time interval, and will not cause the UE to report for two times in the first time interval, thereby relieving pressure of the UE. Specifically, the first time interval may be several successive subframes.

For the UE, the UE may receive a first channel-state information CSI request sent by a first network device, and assume that a time interval that the first network device sends the first channel-state information request is no less than the first time interval.

Specifically, that the UE assumes that a time interval that the first network device sends the first CSI request is greater than the first time interval refers to that, the UE believes that the first network device will not send the first CSI request for two times in the first time interval, so that the UE does not receive the first CSI request any more in the first time interval after receiving the first CSI request once; or the UE receives the first CSI request in the first time interval, but will drop it. That is, after receiving the first CSI request sent by the first network device, the UE drops other first CSI requests received in the first time interval.

In addition, the first time interval is predefined, or is notified by the first network device, and the first time interval is W subframes, where W is a positive integer.

The network device in the foregoing embodiment of the present invention, or another device that communicates with and controls the user equipment.

An embodiment of the present invention further provides a channel-state information process processing method, including: a user equipment receives a first channel-state information CSI request sent by a first network device, and the user equipment drops all CSI requests received in a second time interval before next CSI reporting. The second time interval is predefined, or is notified by the first network device, and the first time interval is W subframes, where W is a positive integer.

Figure 5:
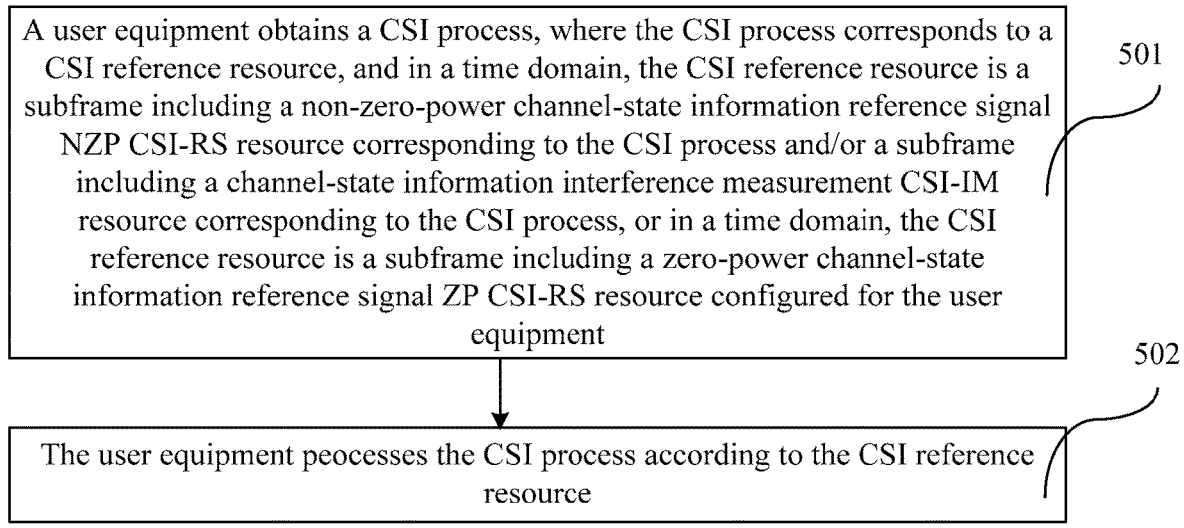
FIG. 5 is a fifth schematic flowchart of a CSI process processing method according to an embodiment of the present invention.

An embodiment of the present invention further provides a channel-state information process processing method. FIG. 5 is a fifth schematic flowchart of a CSI process processing method according to an embodiment of the present invention. As shown in FIG. 5, the method includes the following steps.

Step 501: A user equipment obtains a CSI process, where the CSI process corresponds to a CSI reference resource, and in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment.

Step 502: The user equipment processes the CSI process according to the CSI reference resource.

In the foregoing step 501, the subframe of the ZP CSI-RS resource configured for the user equipment is a subframe of the ZP CSI-RS resource, which has a minimum period and is configured for the user equipment.

Alternatively, in a time domain, the CSI reference resource is a subframe including an NZP CSI-RS resource corresponding to the CSI process and/or a subframe including a CSI-IM resource corresponding to the CSI process, which specifically is:

if a period of the NZP CSI-RS resource corresponding to the CSI process is greater than a period of the CSI-IM resource corresponding to the CSI process, in the time domain, the CSI reference resource is the subframe including the CSI-IM resource corresponding to the CSI process, otherwise, in the time domain, the CSI reference resource is the subframe including the NZP CSI-RS resource corresponding to the CSI process; or if a period of the NZP CSI-RS resource corresponding to the CSI process is equal to a period of the CSI-IM resource corresponding to the CSI process, in the time domain, the CSI reference resource is the subframe including the NZP CSI-RS resource corresponding to the CSI process and/or the subframe including the CSI-IM resource corresponding to the CSI process.

The CSI reference resource is predefined. Alternatively, the method further includes:

The user equipment receives CSI reference resource indication information sent by a first network device, where the CSI reference resource indication information is used to indicate that, in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment.

The CSI reference resource indication information sent by the first network device is radio resource control RRC signaling.

In the foregoing embodiment, the CSI processes are CSI processes for periodic reporting or CSI processes for aperiodic reporting.

An embodiment of the present invention further provides the following technical solution, which includes the following steps:

obtaining, by a user equipment, at least two CSI processes, where the at least two CSI processes correspond to a CSI reference resource, and in a time domain, the CSI reference resource is any one or a combination of a subframe including an NZP CSI-RS resource, a subframe including a CSI-IM resource, or a subframe including a ZP CSI-RS resource; and processing, by the user equipment, the CSI processes according to the CSI reference resource.

Specifically, in the foregoing embodiment, if the reference resource includes an NZP CSI-RS resource or a CSI-IM resource in the time domain, the NZP CSI-RS resource or the CSI-IM resource has a minimum period or a minimum subframe offset among NZP CSI-RS resources and CSI-IM resources respectively corresponding to the at least two CSI processes;

if the CSI reference resource includes an NZP CSI-RS resource in the time domain, the NZP CSI-RS resource has a minimum period or a minimum subframe offset among NZP CSI-RS resources respectively corresponding to the at least two CSI processes;

if the CSI reference resource includes an NZP CSI-IM resource in the time domain, the NZP CSI-IM resource has a minimum period or a minimum subframe offset among NZP CSI-IM resources respectively corresponding to the at least two CSI processes; or if the reference resource includes a ZP CSI-RS resource in the time domain, the ZP CSI-RS resource has a minimum period or a minimum subframe offset among ZP CSI-RS resources configured for the user equipment.

In the foregoing embodiment, the CSI reference resource is predefined. Alternatively, the method further includes:

receiving, by the user equipment, CSI reference resource indication information sent by a first network device, where the CSI reference resource indication information is used to indicate that, in a time domain, the CSI reference resource is any one or a combination of a subframe including an NZP CSI-RS resource, a subframe including a CSI-IM resource, or a subframe including a ZP CSI-RS resource.

The CSI reference resource indication signaling is RRC signaling.

In the foregoing embodiment, the CSI processes are CSI processes for periodic reporting or CSI processes for aperiodic reporting.

An embodiment of the present invention further provides a technical solution. That is, a user equipment obtains a CSI process, where the CSI process corresponds to at least two CSI reference resources. Specifically, in the at least two CSI reference resources, at least one CSI reference resource is a reference resource of a CQI channel part in the CSI process, and is a subframe including an NZP CSI-RS resource corresponding to the CSI process in a time domain; and at least one CSI reference resource is a reference resource of a CQI interference part in the CSI process, and is a subframe including a CSI-IM resource corresponding to the CSI process in a time domain. In this embodiment, the CSI processes are CSI processes for periodic reporting or CSI processes for aperiodic reporting.

An embodiment of the present invention further provides the following technical solution. A user equipment obtains a CSI process, where a CSI reference resource corresponding to the CSI process is multiple subframes in a time domain. The multiple subframes are L subframes before a subframe triggering the CSI process or include the subframe triggering the CSI process and L−1 subframes before the subframe triggering the CSI process, where L is a positive integer. In addition, the value of L is predefined, or is notified by a network device. In this embodiment, the CSI processes are CSI processes for periodic reporting or CSI processes for aperiodic reporting.

The foregoing several embodiments of the present invention may be summed up as the following solutions.

The first solution includes the following steps.

For a situation where a CSI process has a CSI reference resource, the user equipment processes the CSI process according to the reference resource.

In a time domain, the CSI reference resource is a subframe including a non-zero-power channel-state information reference signal resource (NZP CSI-RS resource) associated with the CSI process, and/or, in a time domain, the CSI reference resource is a subframe including an interference measurement resource (IMR) associated with the CSI process.

The second solution is for a situation where a CSI process has a CSI reference resource, and the user equipment processes the CSI process according to the reference resource.

In a time domain, the CSI reference resource is a subframe including a zero-power channel-state information reference signal resource (ZP CSI-RS resource) configured for the user equipment.

The third solution is for a situation where multiple CSI processes have a same CSI reference resource, and the CSI reference resource includes a CSI-RS resource and/or IMR.

The user equipment may be notified of configuration of the CSI reference resource in an implicit notification manner. For the first method and the second method: if a period of the NZP CSI-RS resource associated with the CSI process is greater than a period of the IMR associated with the CSI process, in the time domain, the CSI reference resource is a subframe including the IMR associated with the CSI process, otherwise, in the time domain, the CSI reference resource is a subframe including the NZP CSI-RS associated with the CSI process; and if a period of the NZP CSI-RS associated with the CSI process is equal to a period of the IMR associated with the CSI process, in the time domain, the CSI reference resource is a subframe including the NZP CSI-RS or the IMR associated with the CSI process.

For the third method: if periods of the IMRs corresponding to the multiple CSI processes are different, in the time domain, the reference resource is a subframe including the IMR with a minimum period among the IMRs; and if periods of the IMRs corresponding to the multiple CSI processes are the same, in the time domain, the reference resource is a subframe including the IMR with a minimum subframe offset among the IMRs.

The user equipment may also be notified of the configuration of the reference resource in an explicit signaling manner, where the explicit signaling includes RRC (radio resource control) signaling.

The configuration of the reference resource may also be predefined, which includes: it is defined that, in the time domain, the reference resource is a subframe including the NZP CSI-RS resource or the IMR corresponding to the CSI process, or it is defined that, in the time domain, the reference resource is a subframe including the ZP CSI-RS resource configured for the UE.

The fourth solution is for a situation where a CSI process has two CSI reference resources, where the first CSI reference resource is a reference resource of a CQI channel part in the CSI process, and in the time domain, is a subframe including the CSI-RS resource associated with the CSI process, and the second CSI reference resource is a reference resource of a CQI interference part in the CSI process, and in the time domain, is a subframe including the IMR associated with the CSI process.

The fifth solution is for a situation where a CSI reference resource of a CSI process is multiple subframes in the time domain. The multiple subframes are L subframes before a subframe triggering the CSI process or include the subframe triggering the CSI process and L−1 subframes before the subframe triggering the CSI process.

In the foregoing embodiments of the present invention, by defining that in a time domain, a reference resource corresponding to a CSI process is a subframe or multiple subframes including a resource (such as NZP CSI-RS and CSI-IM) appearing in a certain period, a UE only measures and calculates corresponding CSI according to the reference resource corresponding to the CSI process, and for multiple CSI processes which are triggered for many times and have the same reference resource, the UE only needs to measure and calculate the corresponding CSI once, thereby reducing UE complexity for CSI process processing, solving a problem of high UE complexity for CSI process processing, and solving the problem existing after a CoMP technology is introduced to some extent that the UE cannot implement processing of multiple CSI processes. The technical solutions of the present invention may be used in a situation where the user equipment receives a CSI request on one carrier, and may also be used in a situation where the user equipment receives CSI requests on multiple carriers. In the foregoing embodiments of the present invention, the setting of a first threshold and the setting of numerical values of N, K, and L in a CSI process processing capability of the user equipment may be defined for the situation that the CSI request is on one carrier; and may also be defined for the situation that the CSI requests are on multiple carriers. Then, the defined numerical values are allocated on the CSI request on each carrier. A numerical value may further be defined separately for a CSI request on one carrier. If there are CSI requests on C carriers, it is set that corresponding values of the CSI requests on the C carriers is C times of the numerical values defined above. Alternatively, a numerical value may further be defined separately for a CSI request on one carrier. If there are CSI requests on multiple carriers, it is set that corresponding values of the CSI requests on the multiple carriers is D times of the numerical values defined above, where D is a fixed value, for example, D=2.

Figure 6:
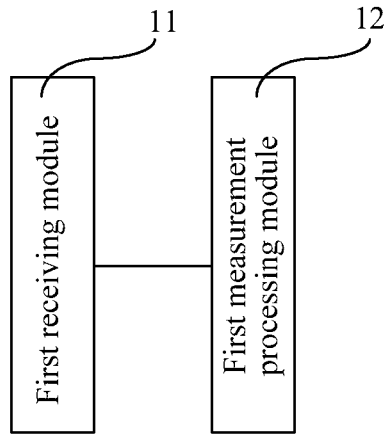
FIG. 6 is a first schematic structural diagram of a user equipment according to an embodiment of the present invention.

FIG. 6 is a first schematic structural diagram of a user equipment according to an embodiment of the present invention. As shown in FIG. 6, the user equipment includes a first receiving module 11 and a first measurement processing module 12. The first receiving module 11 is configured to receive a first channel-state information CSI request sent by a first network device, where the first CSI request is used to trigger aperiodic CSI reporting. The first measurement processing module 12 is configured to: when CSI corresponding to multiple aperiodic CSI processes has not been reported by the user equipment, drop CSI corresponding to a part of aperiodic CSI processes among the multiple aperiodic CSI processes, where each CSI process is associated with a channel measurement resource and an interference measurement resource.

In the foregoing embodiment of the present invention, the aperiodic CSI processes are CSI processes for aperiodic CSI reporting.

Further, that the first measurement processing module drops CSI corresponding to a part of aperiodic CSI processes among the multiple aperiodic CSI processes is dropping reporting of the CSI corresponding to the part of aperiodic CSI processes among the multiple aperiodic CSI processes.

The multiple aperiodic CSI processes are aperiodic CSI processes corresponding to the first CSI request.

Before receiving the first CSI request sent by the first network device, the first receiving module 11 further receives a second CSI request, where the multiple aperiodic CSI processes are aperiodic CSI processes corresponding to the first CSI request and aperiodic CSI processes corresponding to the second CSI request.

That the first measurement processing module 12 drops CSI corresponding to a part of aperiodic CSI processes among the multiple aperiodic CSI processes includes: if the number of the multiple aperiodic CSI processes exceeds a first threshold, dropping the CSI corresponding to the part of aperiodic CSI processes among the multiple aperiodic CSI processes.

Further, the dropping CSI corresponding to a part of aperiodic CSI processes among the multiple aperiodic CSI processes includes: dropping the CSI corresponding to the part of aperiodic CSI processes, so that the number of aperiodic CSI processes not dropped among the multiple aperiodic CSI processes is less than or equal to the first threshold.

The first threshold is predefined, or is notified by the first network device, or is notified by a second network device.

The first measurement processing module 12 is specifically configured to drop, according to a dropping rule or priority, the CSI corresponding to the part of aperiodic CSI processes among the multiple aperiodic CSI processes corresponding to the first CSI request; or drop CSI corresponding to all aperiodic CSI processes corresponding to the first CSI request, where the CSI corresponding to all aperiodic CSI processes corresponding to the first CSI request is the CSI corresponding to the part of aperiodic CSI processes.

In addition, the first measurement processing module 12 is specifically configured to drop, according to a dropping rule or priority, channel-state information of a part of aperiodic CSI processes among the multiple aperiodic CSI processes corresponding to the first CSI request and the second CSI request; or drop CSI corresponding to all aperiodic CSI processes corresponding to the first CSI request, where the CSI corresponding to all aperiodic CSI processes corresponding to the first CSI request is the CSI corresponding to the part of aperiodic CSI processes.

The dropping rule includes any one or several of the following four items:

dropping CSI corresponding to an aperiodic CSI process with a minimum index number or CSI corresponding to an aperiodic CSI process with a maximum index number; dropping CSI corresponding to an aperiodic CSI process that is triggered first or CSI corresponding to an aperiodic CSI process that is triggered last; dropping CSI corresponding to an aperiodic CSI process with longest time since last feedback or CSI corresponding to an aperiodic CSI process with shortest time since last feedback; and dropping CSI corresponding to an aperiodic CSI process with a highest feedback frequency or CSI corresponding to an aperiodic CSI process with a lowest feedback frequency; and CSI corresponding to an aperiodic CSI process with a low priority is dropped first, and the priority includes any one or several of the following four items: a priority of CSI corresponding to an aperiodic CSI process with a small index number is higher than that of CSI corresponding to an aperiodic CSI process with a large index number or a priority of CSI corresponding to an aperiodic CSI process with a large index number is higher than that of CSI corresponding to an aperiodic CSI process with a small index number, a priority of CSI corresponding to an aperiodic CSI process triggered earlier is higher than that of CSI corresponding to an aperiodic CSI process triggered later or a priority of CSI corresponding to an aperiodic CSI process triggered later is higher than that of CSI corresponding to an aperiodic CSI process triggered earlier, a priority of CSI corresponding to an aperiodic CSI process with a long time since last feedback is higher than that of CSI corresponding to an aperiodic CSI process with a short time since last feedback or a priority of CSI corresponding to an aperiodic CSI process with a short time since last feedback is higher than that of CSI corresponding to an aperiodic CSI process with a long time since last feedback, and a priority of CSI corresponding to an aperiodic CSI process with a high feedback frequency is higher than that of CSI corresponding to an aperiodic CSI process with a low feedback frequency or a priority of CSI corresponding to an aperiodic CSI process with a low feedback frequency is higher than that of CSI corresponding to an aperiodic CSI process with a high feedback frequency.

In addition, the first measurement processing module 12 may further be specifically configured to drop CSI corresponding to a part of aperiodic CSI processes according to the number of aperiodic CSI processes with corresponding CSI not reported by the user equipment and a CSI process processing capability of the user equipment.

The CSI process processing capability of the user equipment is a predefined CSI process processing capability of the user equipment or a minimum CSI process processing capability of each user equipment. In addition, the CSI process processing capability of the user equipment is processing N CSI processes per ms, or is processing K CSI processes per M ms, where N is a positive number, and M and K are positive integers.

Further, the CSI process processing capability of the user equipment includes multiple capability levels, where different capability levels correspond to different N values, or correspond to different combinations of M values and K values.

The user equipment may further include a first sending module. The first sending module is configured to report the CSI process processing capability of the user equipment to the first network device or the second network device.

The user equipment may further include a second sending module. The second sending module is configured to send CSI obtained through measurement to the first network device or the second network device, where CSI corresponding to dropped processing of aperiodic CSI processes is replaced by a previous measurement result or is replaced by a preset first sequence, and the preset first sequence represents that the user equipment drops the aperiodic CSI processes.

The preset first sequence is an all-0 sequence or an all-1 sequence.

Further, the first measurement processing module 12 may further be configured to: if CSI corresponding to multiple periodic CSI processes has not been reported further by the user equipment in addition to the CSI, which has not been reported, corresponding to the multiple aperiodic CSI processes, drop CSI, which has not been reported, corresponding to a part of CSI processes. Specifically, when the total number of periodic CSI processes and aperiodic CSI processes, which are not reported by the user equipment, exceeds the first threshold, a part of CSI corresponding to the periodic CSI processes and/or CSI corresponding to the aperiodic CSI processes is dropped.

Figure 7:
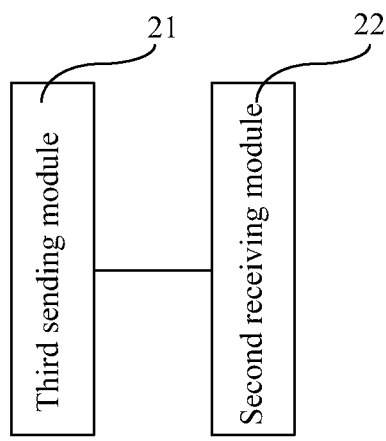
FIG. 7 is a first schematic structural diagram of a network device according to an embodiment of the present invention.

FIG. 7 is a first schematic structural diagram of a network device according to an embodiment of the present invention. As shown in FIG. 7, the network device includes a third sending module 21 and a second receiving module 22. The third sending module 21 is configured to send a first channel-state information CSI request to a user equipment, where the first CSI request is used to trigger aperiodic CSI reporting. The second receiving module 22 is configured to receive CSI obtained by the user equipment through measurement, where the CSI is obtained after dropping CSI corresponding to a part of aperiodic CSI processes among multiple aperiodic CSI processes when CSI corresponding to multiple aperiodic CSI processes has not been reported by the user equipment, where each CSI process is associated with a channel measurement resource and an interference measurement resource.

In the foregoing embodiment, the aperiodic CSI processes are CSI processes for aperiodic CSI reporting. Dropping CSI corresponding to a part of aperiodic CSI processes among the multiple aperiodic CSI processes is dropping reporting of the CSI corresponding to the part of aperiodic CSI processes among the multiple aperiodic CSI processes.

In the foregoing embodiment, CSI corresponding to dropped processing of aperiodic CSI processes is replaced by a previous measurement result or is replaced by a preset first sequence, and the preset first sequence represents that the user equipment drops the aperiodic CSI processes. The preset first sequence is an all-0 sequence or an all-1 sequence.

In the foregoing embodiment, the user equipment drops CSI corresponding to a part of aperiodic CSI processes among the multiple aperiodic CSI processes when the number of the multiple aperiodic CSI processes exceeds a first threshold, or drops CSI corresponding to a part of aperiodic CSI processes according to the number of aperiodic CSI processes not reported by the user equipment and a CSI process processing capability of the user equipment.

Further, the third sending module 21 is further configured to send the first threshold to the user equipment.

The second receiving module 22 may further be configured to receive the CSI process processing capability reported by the user equipment.

The CSI process processing capability of the user equipment is processing N CSI processes per ms, or is processing K CSI processes per M ms, where N is a positive number, and M and K are positive integers.

In addition, the CSI process processing capability of the user equipment includes multiple capability levels, where different capability levels correspond to different N values, or correspond to different combinations of M values and K values.

Figure 8:
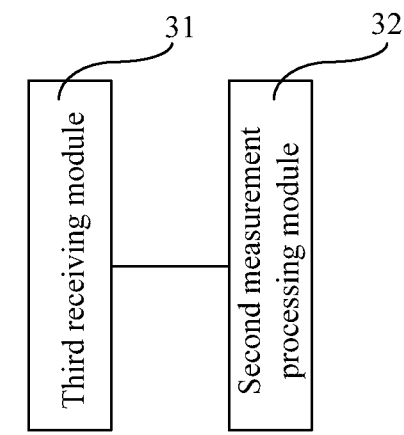
FIG. 8 is a second schematic structural diagram of a network device according to an embodiment of the present invention.

FIG. 8 is a second schematic structural diagram of a network device according to an embodiment of the present invention. As shown in FIG. 8, the network device includes a third receiving module 31 and a second measurement processing module 32. The third receiving module 31 is configured to receive a first channel-state information CSI request sent by a first network device, where the first CSI request is used to trigger aperiodic CSI reporting. The second measurement processing module 32 is configured to: when CSI corresponding to multiple aperiodic CSI processes has not been reported by the user equipment, drop processing of a part of information in a part of aperiodic CSI processes, where each CSI process is associated with a channel measurement resource and an interference measurement resource, and the part of information in the aperiodic CSI processes includes at least one of a channel quality indication, a precoding matrix indication, a precoding type indication, or a rank indication.

The aperiodic CSI processes are CSI processes for aperiodic CSI reporting.

The third receiving module 31 is further configured to receive first dropping indication information sent by the first network device, where the first dropping indication information carries a limit value of at least one of information of the part of aperiodic CSI processes; or receive second dropping indication information sent by the first network device, where the second dropping indication information is used to indicate reporting at least one of information of the part of aperiodic CSI processes by using a measurement value reported last time.

Figure 9:
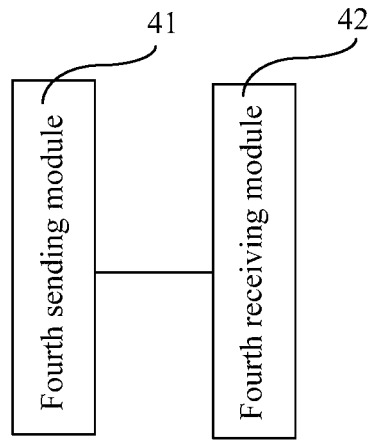
FIG. 9 is a third schematic structural diagram of a network device according to an embodiment of the present invention.

FIG. 9 is a third schematic structural diagram of a network device according to an embodiment of the present invention. As shown in FIG. 9, the network device includes a fourth sending module 41 and a fourth receiving module 42. The fourth sending module 41 is configured to send a first channel-state information CSI request to a user equipment, where the first CSI request is used to trigger aperiodic CSI reporting. The fourth receiving module 42 is configured to receive CSI obtained by the user equipment through measurement, where the CSI is obtained after dropping processing of a part of information in a part of aperiodic CSI processes when CSI corresponding to multiple aperiodic CSI processes has not been reported by the user equipment, where each CSI process is associated with a channel measurement resource and an interference measurement resource, and the part of information in the aperiodic CSI processes includes at least one of a channel quality indication, a precoding matrix indication, a precoding type indication, or a rank indication.

The aperiodic CSI processes are CSI processes for aperiodic CSI reporting.

The fourth sending module 41 is further configured to send first dropping indication information to the user equipment, where the first dropping indication information carries a limit value of at least one of information of the part of aperiodic CSI processes; or send second dropping indication information to the user equipment, where the second dropping indication information is used to indicate reporting at least one of information of the part of aperiodic CSI processes by using a measurement value reported last time.

An embodiment of the present invention further provides a network device, including a fifth sending module, where the module is configured to send a first channel-state information CSI request to a user equipment, and a time interval for sending the first CSI request is no less than a first time interval. The first time interval is a predefined time interval. Alternatively, the fifth sending module is further configured to send a notification message carrying the first time interval to the user equipment.

An embodiment of the present invention further provides a user equipment. The user equipment includes a fifth receiving module, where the module is configured to receive a first channel-state information CSI request sent by a first network device, and assume that a time interval that the first network device sends the first CSI request is no less than a first time interval. The assuming, by the fifth receiving module, that a time interval that the first network device sends the first CSI request is no less than a first time interval includes: after receiving the first CSI request sent by the first network device, dropping other first CSI requests received in the first time interval.

The first time interval is predefined, or is notified by the first network device, and the first time interval is W subframes, where W is a positive integer.

An embodiment of the present invention further provides a user equipment. The user equipment includes a sixth receiving module, where the module is configured to receive a first channel-state information CSI request sent by a first network device, and the user equipment drops all CSI requests received in a second time interval before next CSI reporting.

The second time interval is predefined, or is notified by the first network device, and the first time interval is W subframes, where W is a positive integer.

Figure 10:
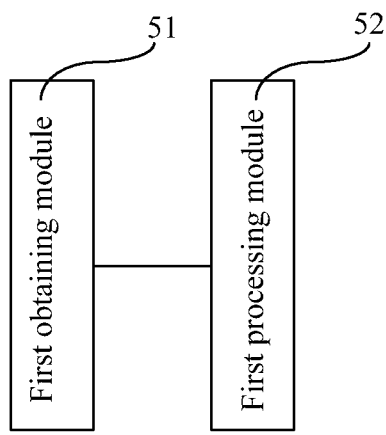
FIG. 10 is a second schematic structural diagram of a user equipment according to an embodiment of the present invention.

FIG. 10 is a second schematic structural diagram of a user equipment according to an embodiment of the present invention. As shown in FIG. 10, the user equipment includes a first obtaining module 51 and a first processing module 52. The first obtaining module 51 is configured to obtain a CSI process, where the CSI process corresponds to a CSI reference resource, and in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment. The first processing module 52 is configured to process the CSI process according to the CSI reference resource. The subframe of the ZP CSI-RS resource configured for the user equipment is a subframe of the ZP CSI-RS resource, which has a minimum period and is configured for the user equipment; or, in a time domain, the CSI reference resource is a subframe including an NZP CSI-RS resource corresponding to the CSI process and/or a subframe including a CSI-IM resource corresponding to the CSI process, which specifically is:

if a period of the NZP CSI-RS resource corresponding to the CSI process is greater than a period of the CSI-IM resource corresponding to the CSI process, in the time domain, the CSI reference resource is the subframe including the CSI-IM resource corresponding to the CSI process, otherwise, in the time domain, the CSI reference resource is the subframe including the NZP CSI-RS resource corresponding to the CSI process; or if a period of the NZP CSI-RS resource corresponding to the CSI process is equal to a period of the CSI-IM resource corresponding to the CSI process, in the time domain, the CSI reference resource is the subframe including the NZP CSI-RS resource corresponding to the CSI process and/or the subframe including the CSI-IM resource corresponding to the CSI process.

The CSI reference resource is predefined. The user equipment further includes a first indication receiving module, and the module is configured to receive CSI reference resource indication information sent by a first network device, where the CSI reference resource indication information is used to indicate that, in a time domain, the CSI reference resource is a subframe including a non-zero-power channel-state information reference signal NZP CSI-RS resource corresponding to the CSI process and/or a subframe including a channel-state information interference measurement CSI-IM resource corresponding to the CSI process, or in a time domain, the CSI reference resource is a subframe including a zero-power channel-state information reference signal ZP CSI-RS resource configured for the user equipment.

The received CSI reference resource indication information sent by the first network device is radio resource control RRC signaling.

Figure 11:
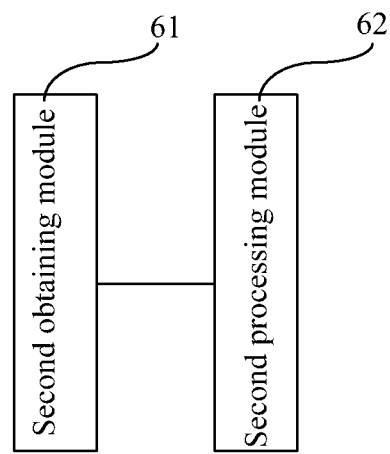
FIG. 11 is a third schematic structural diagram of a user equipment according to an embodiment of the present invention.

FIG. 11 is a third schematic structural diagram of a user equipment according to an embodiment of the present invention. As shown in FIG. 11, the user equipment includes a second obtaining module 61 and a second processing module 62. The second obtaining module 61 is configured to obtain at least two CSI processes, where the at least two CSI processes correspond to a CSI reference resource, and in a time domain, the CSI reference resource is any one or a combination of a subframe including an NZP CSI-RS resource, a subframe including a CSI-IM resource, or a subframe including a ZP CSI-RS resource. The second processing module 62 is configured to process the CSI processes according to the CSI reference resource.

If the reference resource includes an NZP CSI-RS resource or a CSI-IM resource in the time domain, the NZP CSI-RS resource or the CSI-IM resource has a minimum period or a minimum subframe offset among NZP CSI-RS resources and CSI-IM resources respectively corresponding to the at least two CSI processes;

if the CSI reference resource includes an NZP CSI-RS resource in the time domain, the NZP CSI-RS resource has a minimum period or a minimum subframe offset among NZP CSI-RS resources respectively corresponding to the at least two CSI processes;

if the CSI reference resource includes an NZP CSI-IM resource in the time domain, the NZP CSI-IM resource has a minimum period or a minimum subframe offset among NZP CSI-IM resources respectively corresponding to the at least two CSI processes; or if the reference resource includes a ZP CSI-RS resource in the time domain, the ZP CSI-RS resource has a minimum period or a minimum subframe offset among ZP CSI-RS resources configured for the user equipment.

The CSI reference resource is predefined, or, the user equipment further includes: a second indication receiving module, configured to receive CSI reference resource indication information sent by a first network device, where the CSI reference resource indication information is used to indicate that, in a time domain, the CSI reference resource is any one or a combination of a subframe including an NZP CSI-RS resource, a subframe including a CSI-IM resource, or a subframe including a ZP CSI-RS resource.

The CSI reference resource indication signaling is radio resource control RRC signaling.

An embodiment of the present invention further provides a user equipment, which includes a third obtaining module, configured to obtain a CSI process, where the CSI process corresponds to at least two CSI reference resources.

In the at least two CSI reference resources, at least one CSI reference resource is a reference resource of a CQI channel part in the CSI process, and is a subframe including an NZP CSI-RS resource corresponding to the CSI process in a time domain; and at least one CSI reference resource is a reference resource of a CQI interference part in the CSI process, and is a subframe including a CSI-IM resource corresponding to the CSI process in a time domain.

An embodiment of the present invention further provides a user equipment, including: a fourth obtaining module, configured to obtain a CSI process, where a CSI reference resource corresponding to the CSI process is multiple subframes in a time domain.

The multiple subframes are L subframes before a subframe triggering the CSI process or include the subframe triggering the CSI process and L−1 subframes before the subframe triggering the CSI process, where L is a positive integer.

The L is predefined or is notified by a network device.

The CSI processes are CSI processes for periodic reporting or CSI processes for aperiodic reporting.

In the foregoing embodiments of the present invention, by defining that in a time domain, a reference resource corresponding to a CSI process is a subframe or multiple subframes including a resource (such as NZP CSI-RS and CSI-IM) appearing in a certain period, a UE only measures and calculates corresponding CSI according to the reference resource corresponding to the CSI process, and for multiple CSI processes which are triggered for many times and have the same reference resource, the UE only needs to measure and calculate the corresponding CSI once, thereby reducing UE complexity for CSI process processing, solving a problem of high UE complexity for CSI process processing, and solving the problem existing after a CoMP technology is introduced to some extent that the UE cannot implement processing of multiple CSI processes.

The "multiple" in the embodiments of the present invention can be understood as "at least two".

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. An apparatus comprising a storage medium including processor-executable instructions, and a processor coupled to the storage medium, wherein the processor-executable instructions, when executed by the processor, cause the apparatus to:

send a first channel-state information (CSI) request to a terminal device to request the terminal sending aperiodic CSI; and in response to the first CSI request, receive aperiodic CSI corresponding to multiple CSI processes, wherein the aperiodic CSI comprises a first part and a second part, the first part is associated with a part of the multiple CSI processes, and is a previous measurement result when a quantity of the multiple aperiodic CSI processes exceeds a first threshold, and the second part is associated with other part of the multiple CSI processes.

2. The apparatus according to claim 1, wherein the processor-executable instructions, when executed by the processor, further cause the apparatus to send a second CSI request to the terminal device, wherein the multiple aperiodic CSI processes are associated with the first CSI request and the second CSI request.

3. The apparatus according to claim 1, wherein the quantity of the other part of the multiple aperiodic CSI processes is less than or equal to the first threshold, and a sum of the quantity of the part of the multiple aperiodic CSI processes and the quantity of the other part of the multiple aperiodic CSI processes is equal to the quantity of the multiple aperiodic CSI processes.

4. The apparatus according to claim 1, wherein the first threshold is predefined.

5. An apparatus comprising a storage medium including processor-executable instructions; and a processor coupled to the storage medium, wherein the processor-executable instructions, when executed by the processor, cause the apparatus to:

receive a first channel-state information (CSI) request from a first network device to trigger aperiodic CSI reporting;

in response to receiving the CSI request, when aperiodic CSI associated with a part of multiple aperiodic CSI processes has not been reported, drop processing of the aperiodic CSI; and send CSI obtained through measurement of the first network device or a second network device, wherein the CSI comprises a second part of CSI associated with another part of the multiple aperiodic CSI processes.

6. The apparatus according to claim 5, wherein the CSI further comprises a first part of CSI associated with the part of the multiple aperiodic CSI processes, and the first part of CSI includes a previous measurement result.

7. The apparatus according to claim 6, wherein the processor-executable instructions, when executed by the processor, cause the apparatus to drop processing of the aperiodic CSI as follows:

when the number of the multiple aperiodic CSI processes exceeds a first threshold, dropping processing of the aperiodic CSI from the multiple aperiodic CSI processes, so that a quantity of aperiodic CSI processes which are not dropped from the multiple aperiodic CSI processes is less than or equal to the first threshold.

8. The apparatus according to claim 7, wherein the first threshold is predefined.

9. The apparatus according to claim 6, wherein the processor-executable instructions, when executed by the processor, cause the apparatus to drop processing of the aperiodic CSI as follows:

dropping processing of aperiodic CSI associated with an aperiodic CSI process with a minimum index number.

10. The apparatus according to claim 6, wherein the processor-executable instructions, when executed by the processor, cause the apparatus to drop processing of the aperiodic CSI as follows:

dropping processing of aperiodic CSI associated with an aperiodic CSI process that is triggered last.

11. The apparatus according to claim 5, wherein the processor-executable instructions, when executed by the processor, cause the apparatus to drop processing of the aperiodic CSI as follows:

dropping processing of aperiodic CSI associated with an aperiodic CSI process with a maximum index number.

12. The apparatus according to claim 5, wherein the processor-executable instructions, when executed by the processor, cause the apparatus to drop processing of the aperiodic CSI as follows:

dropping processing of aperiodic CSI corresponding to an aperiodic CSI process that is triggered first.

13. The apparatus according to claim 5, wherein the processor-executable instructions, when executed by the processor, cause the apparatus to drop processing of the aperiodic CSI as follows:

dropping processing of the aperiodic CSI associated with the part of multiple aperiodic CSI processes according to a quantity of aperiodic CSI processes not reported and a CSI process processing capability.

14. A non-transitory computer-readable storage medium comprising instructions which, when executed by a terminal device, cause the terminal device to carry out operations including:

receiving a first channel-state information (CSI) request from a first network device to trigger aperiodic CSI reporting;

in response to receiving the CSI request, when aperiodic CSI associated with a part of multiple aperiodic CSI processes has not been reported, dropping processing of the aperiodic CSI; and sending CSI obtained through measurement of the first network device or a second network device, wherein the CSI comprises a second part of CSI corresponding to another part of the multiple aperiodic CSI processes.

15. The non-transitory computer-readable storage medium according to claim 14, wherein the CSI further comprises a first part of CSI corresponding to the part of the multiple aperiodic CSI processes, and the first part of CSI includes a previous measurement result.

16. The non-transitory computer-readable storage medium according to claim 15, wherein the instructions cause the terminal device to drop processing of the aperiodic CSI as follows:

when a quantity of the multiple aperiodic CSI processes exceeds a first threshold, dropping processing of the aperiodic CSI from the multiple aperiodic CSI processes, so that a quantity of aperiodic CSI processes which are not dropped from the multiple aperiodic CSI processes is less than or equal to the first threshold.

17. The non-transitory computer-readable storage medium according to claim 16, wherein the first threshold is predefined.

18. The non-transitory computer-readable storage medium according to claim 14, wherein the instructions cause the terminal device to drop processing of the aperiodic CSI as follows:

dropping processing of aperiodic CSI associated with an aperiodic CSI process with a minimum index number; or dropping processing of aperiodic CSI associated with an aperiodic CSI process that is triggered last.

19. The non-transitory computer-readable storage medium according to claim 14, wherein the instructions cause the terminal device to drop processing of the aperiodic CSI as follows:

dropping processing of aperiodic CSI associated with an aperiodic CSI process with a maximum index number; or dropping processing of aperiodic CSI associated with an aperiodic CSI process that is triggered first.

20. The non-transitory computer-readable storage medium according to claim 14, wherein the instructions cause the terminal device to drop processing of the aperiodic CSI as follows:

dropping processing of the aperiodic CSI associated with the part of aperiodic CSI processes according to a quantity of the multiple aperiodic CSI processes not reported and a CSI process processing capability of the terminal device.

* * * * *